May 20, 1969 B. L. WILKINSON 3,445,775

MAGNETIC AMPLIFIER

Filed May 8, 1967

INVENTOR
BRUCE L. WILKINSON
BY HIS ATTORNEYS
HARRIS, KIECH, RUSSELL & KERN

United States Patent Office 3,445,775
Patented May 20, 1969

3,445,775

MAGNETIC AMPLIFIER

Bruce L. Wilkinson, Torrance, Calif., assignor, by mesne assignments, to Varo Inc., Garland, Tex., a corporation of Texas Filed May 8, 1967, Ser. No. 636,923
Int. Cl. H03f 9/00; H02p 13/12
U.S. Cl. 330—8 2 Claims

ABSTRACT OF THE DISCLOSURE

A magnetic amplifier having first and second cores, with two gate windings on each core and a control winding on both cores. A rectifier in series with a gate winding on the first core and another rectifier in series with a gate winding on the second core. A voltage source connected across the gate winding-rectifier series circuits of each core, with the voltage of the same polarity as the voltage which is induced in the gate winding during resetting of the core thereof, and with each of the rectifiers polarized to block current from the voltage source.

Figure 1:
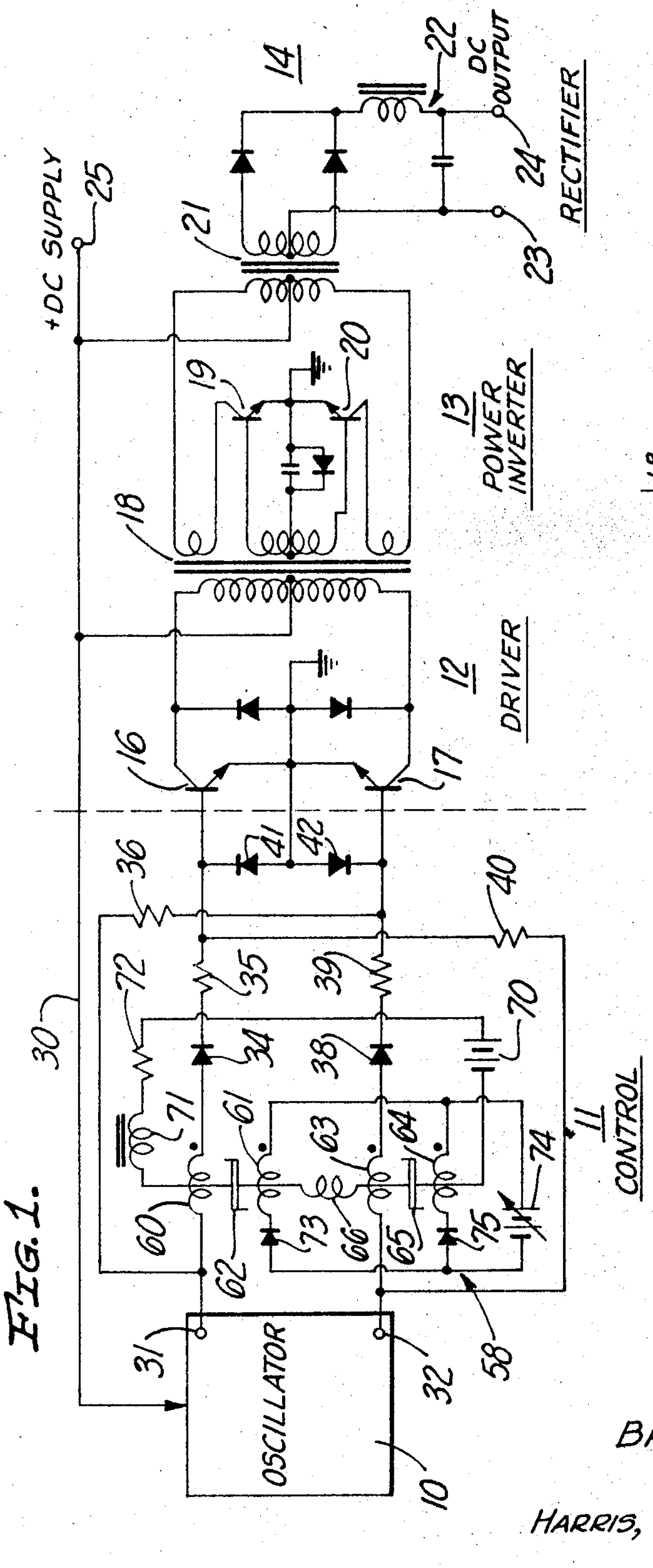

This invention relates to magnetic amplifiers and, in particular, to a new and improved magnetic amplifier having substantially linear gain and a relatively fast response time, with the performance of the amplifier substantially independent of changes in core characteristics, frequency and input voltage.

A specific embodiment of the invention is illustrated herein as used in the control circuit for a voltage regulator such as is shown in my copending application entitled "Voltage Regulator," Ser. No. 569,197, now Pat. No. 3,405,342 filed Aug. 1, 1966. The new magnetic amplifier is not limited to this particular use and may be used in most applications wherein magnetic amplifiers are presently used. Typical examples of other uses are for motor speed control and for motor drive control in servomechanisms.

It is an object of the invention to provide a new and improved magnetic amplifier wherein the gain is relatively independent of changes in core characteristics, frequency and input voltage. A further object is to provide such a magnetic amplifier having substantially linear gain and a relatively fast response time.

It is an object of the invention to provide a new and improved magnetic amplifier including first and second cores of square loop magnetic material with a pair of gate windings on each core and with a control winding on both cores. A further object is to provide such a magnetic amplifier including means for connecting a control current to the control winding for resetting a core to a first flux level. An additional object is to provide such a magnetic amplifier wherein one of the gate windings is used in conjunction with a voltage source and a blocking rectifier for limiting resetting to a value less than the first flux level and controlled by the magnitude of the voltage source. A specific object is to provide such an amplifier wherein the voltage source for application to the one gate winding is of the same polarity as the voltage induced in the gate winding during resetting of the core, with the rectifier polarized to block current from the voltage source.

Other objects, advantages, features and results will more fully appear in the course of the following description. The drawing merely shows and the description merely describes a preferred embodiment of the present invention which is given by way of illustration or example.

Figure 2:
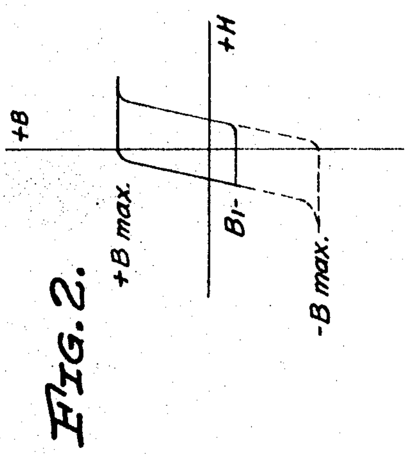

In the drawing:

FIG. 1 is a schematic diagram illustrating a preferred form of the magnetic amplifier incorporated in a voltage regulator; and FIG. 2 is a B–H curve illustrating the operation of the amplifier of the invention.

The regulated power supply of FIG. 1 includes an oscillator 10, a control stage 11, a driver stage 12, a power inverter stage 13, and a rectifier stage 14. The driver, power inverter and rectifier stages are conventional in design and operation and various known circuits may be utilized. Where an A.C. output is desired the rectifier stage may be omitted. This power supply is described in my aforesaid copending application.

The control stage 11 provides for cyclically switching the transistors 16, 17 of the driver stage off and on, with the two transistors operating out of phase. The driver stage is coupled to the power inverter stage via transformer 18 and serves to turn the power transistors 19, 20 off and on, providing an A.C. output at the transformer 21. The A.C. power is rectified in the rectifier stage, which may include a filter section 22 for reducing the ripple voltage. The D.C. output is developed at the output terminals 23, 24. In a typical installation, the switching frequency of the inverter will be in the range of 5 kc. to 50 kc. so that effective filtering can be achieved by the filter 22 utilizing relatively small components. However, the D.C. voltage source provided at terminal 25 may have a substantial variation at a relatively low frequency. For example, a 28 volt D.C. source may have a 3 volt rms. variation in the frequency range of 10 c.p.s. to 100 kc. Conventional filters for reducing this type of variation are usually prohibitive in size and weight.

The oscillator 10 may be conventional in design and typically is a square oscillator designed to operate at the desired switching frequency of the power inverter stage. The frequency of the oscillator output is substantially independent of the amplitude of the D.C. power source energizing the oscillator but the amplitude of the oscillator output varies as a function of the amplitude of the D.C. power source and normally varies linearly with the D.C. power source.

The oscillator 10 is energized from the same D.C. power source as is the power inverter. As indicated in FIG. 1, the oscillator 10 is connected to the power supply terminal 25 via line 30.

The control stage 11 includes a magnetic amplifier 58 having gate windings 60 and 61 on a core 62. Similar gate windings 63 and 64 are provided on another core 65. A control winding 66 is provided on both cores 62 and 65. The control winding 66 is illustrated in FIG. 1 as a single coil but in practice one coil would be utilized on the core 62 and a second coil on the core 65 with the coils preferably connected in series.

The control winding 66 is connected to a D.C. current source, illustrated as a battery 70, through a filter choke 71 and a current limiting resistance 72. The current source 70 may be made adjustable to provide for initial setting of the operation of the magnetic amplifier.

The gate windings 60 and 63 are connected between the input and output of the magnetic amplifier. The gate winding 61 is connected in series with a rectifier 73 across another D.C. voltage source, illustrated as a battery 74. The gate winding 64 is connected in series with a rectifier 75 across the source 74. The rectifiers 73, 75 are polarized opposite to the source 74.

The oscillator output is developed at terminals 31, 32. Terminal 31 is connected to the base of the driver stage transistor 16 through gate winding 60 of the magnetic amplifier, a rectifier 34 and a resistance 35. Terminal 31 is also connected to the base of the driver stage transistor 17 through a resistor 36. The oscillator output terminal 32 is symmetrically connected. The gate winding 63, a rectifier 38 and a resistor 39 are connected in series between the terminal 32 and the base of the transistor 17. A resistor 40 is connected between the terminal 32 and the base of the transistor 16. A rectifier 41 is connected between circuit ground and the base of the transistor 16 and a rectifier 42 is similarly connected between circuit ground and the base of the transistor 17. The rectifiers 41, 42 limit the negative bias voltage on the bases of transistors 16, 17 by clamping the base voltages near circuit ground, thereby protecting the emitter-to-base junctions. This clamping action also provides a stable voltage level with respect to oscillator terminals 31, 32

The control stage 11 incorporating the magnetic amplifier 58 provides for coupling the oscillator output to the driver stage transistors 16, 17 for cyclically switching the transistors between on and off states. In the specific circuit illustrated, a power inverter transistor is on when the corresponding driver transistor is off and the power inverter transistor is off when the corresponding driver transistor is on. Also, a positive voltage at a driver transistor base will turn the transistor on while a negative voltage will turn the transistor off.

The magnetic amplifier functions in the regulator of FIG. 1 as a variable impedance integrating device. For example, at the start of a positive going half cycle of oscillator output at the terminal 31, the gate winding 60 presents a high impedance and a negative voltage is applied to the base of the transistor 16 through the resistor 40. When the flux in the core 62 builds up to the switching point, the unit switches to a low impedance and the voltage at the base of the transistor 16 rises, switching the transistor from the off state to the on state and thereby switching the corresponding power inverter from the on state to the off state.

The amount of flux buildup in the core 62 required to produce the impedance change is a function of the design of the amplifier and is substantially a constant. The amount of flux is directly proportional to the integral of the applied voltage with time so that the impedance change occurs at a given integral value. With a higher D.C. supply voltage and hence a higher oscillator output voltage, the time required to attain the predetermined value will be shorter and the power inverter transistor will be on for a shorter period of time. Conversely, with a lower D.C. supply voltage and hence a lower oscillator output voltage, the time required to reach the predetermined value will be longer and the power inverter transistor will be on for a longer period of time.

During this same half cycle, the positive oscillator output voltage at the terminal 31 is applied to the base of the transistor 17 through the resistor 36 and functions to maintain the transistor 17 on and hence the corresponding power inverter transistor off. The rectifier 38 in series with the gate winding 63 blocks current in the reactor during the negative half cycle. The resistor 35 in series with the winding 60 functions as a current limiting resistor.

The operation of the control circuit during the second half cycle of the oscillator output is the same as described above, with the gate winding 63 on the core 65 being switched from the high impedance state to the low impedance state.

The regulator circuit of FIG. 1 functions to maintain a substantially constant D.C. voltage at the output terminals 23, 24, independent of variations in the D.C. supply voltage at the terminal 25. In the A.C. output from the transformer 21, the average voltage for each half cycle will be substantially a constant. The magnitude of the output voltage can be adjusted by changing the frequency of the oscillator 10 or by changing the voltage from the source 74 of the magnetic amplifier.

In the operation of the magnetic amplifier, the gate winding 61 controls the resetting of the core 62 and the gate winding 64 similarly controls the resetting of the core 65. The point to which the core is reset may be changed by changing the voltage from the source 74, thereby providing a control on the value of the integral at which the other gate winding changes from a high impedance state to a low impedance state. The source 74 may be adjusted manually, or may be utilized as a feedback control from the output of the power supply, or may be used as a control input for any variable voltage source.

The magnetic amplifier 58 provides a variable impedance integrating device with the operation thereof independent of the core characteristics. The gain of the magnetic amplifier of the invention is not as high as that of some other types but the gain is linear and the device has a relatively fast response time.

All magnetic devices work on the principle that while the magnetic flux in a core is changing, a winding on this core will support a voltage proportional to the rate of change of flux and the number of turns in the winding. If a core made of square loop material (square loop material in this case is defined as magnetic material whose magnetization flux level will not change significantly when any applied magnetizing force is removed) magnetized to flux level $B_1$, has a voltage applied to a winding wound on this core for a short period of time, the flux will change to a new value $B_2$. This change in flux $B_2-B_1$ is directly proportional to the integral of the applied voltage during the period of time the voltage was applied. If the voltage remains across the coil long enough B will continue to change until it reaches the saturation value $B_{max}$. Since the material of the core cannot be magnetized beyond $B_{max}$, the value of B stops changing.

During the time B was changing, the current flowing in the coil was no greater than what was required by the core material to cause a change in B. Now that B is not changing the current is determined by the applied voltage and the D.C. resistance of the circuit. Thus, the coil behaves as a switch which is open until the voltage time integral reaches a predetermined value, determined by $B_{max}-B_1$, at which time the switch closes.

FIG. 2 is a typical hysteresis pattern for a square loop magnetic material with magnetizing force H on the horizontal axis and flux level B on the vertical axis and with $B_{max}$ and $B_1$ indicated. The solid line of FIG. 2 illustrates the operation of the new magnetic amplifier and the dashed line shows the remainder of the loop.

The magnetic amplifier may now be made to operate on transistor switches, such as those in the driver stage, causing the transistor switch to be closed when the coil is in the open or blocking state. If these transistors are feeding a load which is supplied by a voltage that is directly proportional to the voltage feeding the saturable coil, then the load will have a pulse whose voltage-time integral is directly proportional to the voltage-time integral of the voltage appearing across the saturable coil.

The average or D.C. value of a series of such pulses is simply the value of this integral multiplied by pulse repetition rate or frequency. In most cases, two of the above systems are employed. They operate alternately and with opposite polarity so as to generate an A.C. voltage in which one of the above pulses constitutes a half cycle. The saturable cores are alternately set back to $B_1$ from $B_{max}$ during the half cycle that the opposite core is controlling. This A.C. voltage is then transformed to the desired voltage, rectified to a train of pulses and filtered to provide D.C. The D.C. value is given by the voltage-time integral which in turn is given by $B_{max}-B_1$ and the frequency. The D.C. voltage level does not depend on the input voltage; it is determined by $B_{max}$, $B_1$, and the operating frequency of the device.

In a conventional magamp system, a second winding is wound on the saturable core and a current is passed through this winding of just the right magnitude to cause the flux to return to $B_1$ during the resetting portion of the cycle. For practical reasons, it is desirable to control both saturable coils with the same current source. Therefore, these second, or control windings, are usually seriesed. This means that the two cores must be closely matched or the value of $B_1$ for one will differ significantly from the value of $B_1$ for the other, which would result in a severe unbalance in the system. For the same reason, the $B_{max}$ values must be matched. In such a system, the output voltage is controlled by simply changing the current in the control winding. The disadvantages are:

(1) The current required to set $B_1$ and the value of $B_{max}$ varies with temperature making the system susceptible to temperature drifts.

(2) At high operating frequencies (above 2 kc.) the current needed to set the core to $B_1$ varies with the magnitude of the driving voltage which destroys the independence of the output voltage from the input voltage. Also, frequency variations will affect the output voltage, which imposes the requirement for a very stable oscillator.

(3) The high inductance of the control winding limits the speed of charging the control current.

In the new magnetic amplifier, a third winding 61, 64 is added to each core 62, 65, respectively. The control winding 66 is biased with more than sufficient current to reset both cores from $B_{max}$ back to $B_1$. When the flux in a core is changing from $B_{max}$ to $B_1$, a voltage is induced in the coils with a voltage-time integral equal to $B_{max}-B_1$. The only difference from the previous case when the flux was changing from $B_1$ to $B_{max}$ is that the voltage is now opposite polarity. If during this resetting period, the induced voltage is limited to some value E by a load on the third winding, then the voltage-time integral reduces to the product of E times the period for a half-cycle, where E is the voltage of the source 74. In this case, the value of $B_{max}-B_1$ is controlled directly and is independent of $B_{max}$, other core characteristics and input voltage. Another interesting aspect of this system is the dependence of the voltage-time integral on frequency. The integral is directly proportional to the period which is inversely proportional to frequency. However, the D.C. output voltage is given by the integral multiplied by the frequency. Therefore, since the integral is inversely proportional to the operating frequency, the D.C. output is independent of the operating frequency, eliminating the need for a stable oscillator.

This system then has the following advantages:

(1) Independent from core characteristics, input voltage, and frequency.

(2) Since the $B_{max}-B_1$ value is determined each cycle by E and since the magamp presents no physical limit to the rate of change of E (like a large capacitance) then the speed of response can be made to approach the theoretical maximum of one half cycle delay.

The disadvantage of this device is that there is only a one-to-one relationship between E and $B_{max}-B_1$ whereas in the conventional system the value of $B_1$ is extremely sensitive to control current which in turn gives the conventional system very high gain as an amplifier. However, when used as a regulator, the insensitivity of the new magnetic amplifier to changes in core characteristics, frequency, and input voltage reduces the gain requirement, offsetting the disadvantage of low gain.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a magnetic amplifier having first and second input and output terminals, the combination of:

first and second cores of square loop magnetic material;
a first gate winding on said first core for connection between first input and output terminals;
a second gate winding on said second core for connection between second input and output terminals;
a third gate winding on said first core;
a fourth gate winding on said second core;
a control winding on said first and second cores;
means for connecting a control source to said control winding;
a first rectifier connected in series with said third gate winding forming a first series circuit;
a second rectifier connected in series with said fourth gate winding forming a second series circuit; and
means for connecting a voltage source across each of said first and second series circuits of the same polarity as the voltage which is induced in the gate winding during resetting of the core thereof, with each of said rectifiers polarized to block current from the voltage source.

2. A magnetic amplifier as defined in claim 1 including a control current of a magnitude adapted to reset a core to a first flux level, and a voltage source of a magnitude adapted to limit resetting of a core to less than said first flux level.

References Cited

UNITED STATES PATENTS

| | | | |
|---|---|---|---|
| 3,374,440 | 3/1968 | Kawai et al. | 330—8 |
| 3,405,342 | 10/1968 | Wilkinson | 321—25 X |

NATHAN KAUFMAN, *Primary Examiner.*

U.S. Cl. X.R.

321—25; 323—89